United States Patent
Guerin et al.

(10) Patent No.: US 11,815,874 B2
(45) Date of Patent: Nov. 14, 2023

(54) AGGREGATE PROGRAMMING METHOD AND SYSTEM FOR CNC MACHINES

(71) Applicant: C. R. Onsrud, Inc., Troutman, NC (US)

(72) Inventors: Richard Leigh Guerin, Denver, NC (US); Travis Scott Buchanan, Stony Point, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 0 days.

(21) Appl. No.: 16/844,520

(22) Filed: Apr. 9, 2020

(65) Prior Publication Data

US 2020/0348644 A1   Nov. 5, 2020

Related U.S. Application Data

(60) Provisional application No. 62/840,664, filed on Apr. 30, 2019.

(51) Int. Cl.
*G05B 19/404* (2006.01)

(52) U.S. Cl.
CPC .. *G05B 19/404* (2013.01); *G05B 2219/36019* (2013.01); *G05B 2219/39177* (2013.01)

(58) Field of Classification Search
CPC ........ G05B 19/404; G05B 2219/39177; G05B 2219/36019; G05B 2219/35252; G05B 2219/50291; G05B 2219/50334
USPC ........................................................ 700/193
See application file for complete search history.

(56) References Cited

U.S. PATENT DOCUMENTS

| | | | | |
|---|---|---|---|---|
| 2003/0120376 A1* | 6/2003 | Shibata | ................... | G05B 19/41 409/80 |
| 2008/0288103 A1* | 11/2008 | Otsuki | ................. | G05B 19/404 700/189 |
| 2009/0140684 A1* | 6/2009 | Otsuki | ................. | G05B 19/404 318/572 |
| 2011/0234142 A1* | 9/2011 | Otsuki | ................. | G05B 19/404 318/572 |
| 2013/0060373 A1* | 3/2013 | Otsuki | ................. | G05B 19/404 700/114 |
| 2014/0005823 A1* | 1/2014 | Otsuki | ............... | G05B 19/4103 700/189 |

(Continued)

*Primary Examiner* — Kenneth M Lo
*Assistant Examiner* — Mohammed Shafayet
(74) *Attorney, Agent, or Firm* — Shumaker, Loop & Kendrick; Patrick B. Horne

(57) ABSTRACT

A method and system for aggregate programming a computer numerical control (CNC) machine that includes (a) shifting a control point from an aggregate base point to a center tip of a tool being programmed, thereby enabling tool length and diameter adjustment along with C-axis aggregate rotation during a machine activity. The shifting includes (i) activating a tilted work plane (TWP); and (ii) shifting the control point to the tip of the tool using a tool length compensation. The system and method also include (b) implementing an activity on the CNC machine using the shifted control point and C-axis aggregate rotation. In some cases, activating the TWP comprises using a special machine control code such as g-code G68.2. In some cases, shifting the control point to the tip of the tool using a tool length compensation comprises using a special machine control code such as g-code G43.

20 Claims, 13 Drawing Sheets

(56) References Cited

U.S. PATENT DOCUMENTS

2019/0271965 A1\* 9/2019 Tsuda ................ G05B 19/4086
2020/0133231 A1\* 4/2020 Pien ................... G05B 19/4097

\* cited by examiner

FIG. 9

AGGREGATE PROGRAMMING METHOD AND SYSTEM FOR CNC MACHINES

CROSS-REFERENCE TO RELATED PATENT APPLICATIONS

This application claims the benefit of and priority to U.S. Provisional Patent Application No. 62/840,664 filed Apr. 30, 2019, herein expressly incorporated by reference in its entirety.

TECHNICAL FIELD AND BACKGROUND OF THE INVENTION

This application relates to computer numerical control (CNC) machines. More specifically, the application relates to the use of computers to control machine tools.

SUMMARY

According to embodiments of the invention, a method for programming a computer numerical control (CNC) machine for using an aggregate tool includes shifting a control point from an aggregate base point to a center tip of a tool, thereby enabling C-axis aggregate rotation during a machine activity; activating a tilted work plane (TWP); shifting the control point to the tip of the tool using a tool length compensation; and implementing an activity on the CNC machine using the shifted control point and C-axis aggregate rotation.

In some embodiments, activating the TWP comprises using a special machine control code. In some such embodiments, the special machine control code is g-code G68.2.

In some embodiments, shifting the control point to the tip of the tool using a tool length compensation comprises using a special machine control code. In some such embodiments, the special machine control code is g-code G43.

According to embodiments of the invention, a system for programming a computer numerical control (CNC) machine for using an aggregate tool includes one or more memory devices; and one or more processing devices operatively coupled to the one or more memory devices, wherein the one or more processing devices are configured to execute computer-readable computer program code to (i) shift a control point from an aggregate base point to a center tip of a tool being programmed, thereby enabling C-axis aggregate rotation during a tool activity, the shifting comprising the steps of: (A) activating a tilted work plane (TWP); and (B) shifting the control point to the tip of the tool using a tool length compensation; and (ii) implementing an activity on the CNC machine using the shifted control point and C-axis aggregate rotation. In some such embodiments, activating the TWP comprises using a special machine control code. In some such embodiments, the special machine control code is g-code G68.2.

In some embodiments, shifting the control point to the tip of the tool using a tool length compensation comprises using a special machine control code. In some such embodiments the special machine control code is g-code G43.

According to embodiments of the invention, a computer numerical control (CNC) machine is programmed to shift a control point from an aggregate base point to a center tip of a tool being programmed, thereby enabling C-axis aggregate rotation during a machine activity; activate a tilted work plane (TWP); shift the control point to the tip of the tool using a tool length compensation; and implement an activity on the CNC machine using the shifted control point and C-axis aggregate rotation.

In some such embodiments, activating the TWP comprises using a special machine control code. In some such embodiments, the special machine control code is g-code G68.2.

In some embodiments, shifting the control point to the tip of the tool using a tool length compensation comprises using a special machine control code.

In some embodiments, the special machine control code is g-code G43.

BRIEF DESCRIPTION OF THE DRAWINGS

FIG. 9 illustrates another screenshot of an aggregate setup in a CAM software program according to embodiments of the invention;

DETAILED DESCRIPTION OF THE INVENTION

Figure 1:
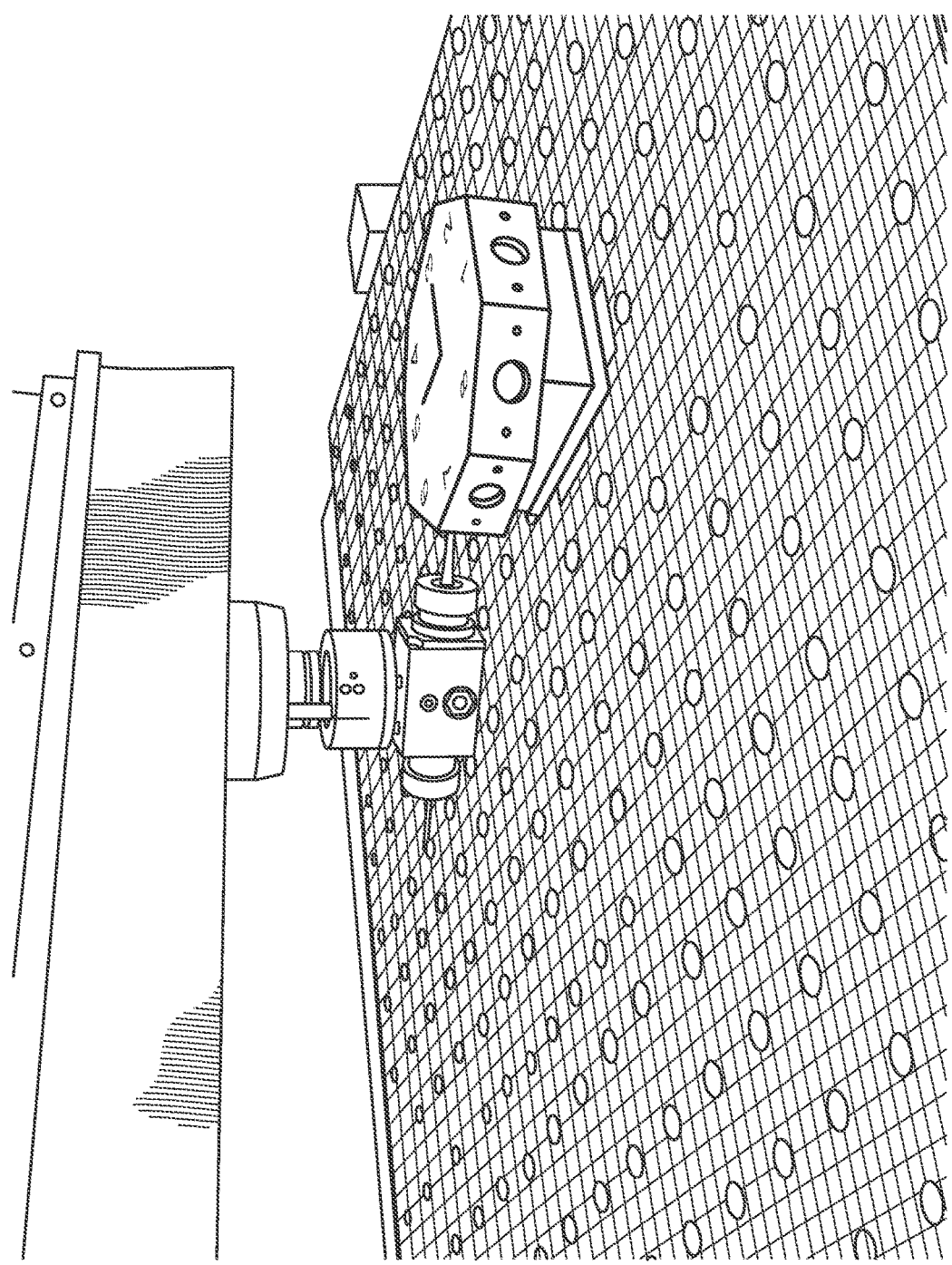
FIG. 1 illustrates a CNC machine shown machining a test workpiece.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Referring now to the drawings and the listing of machine components set out below, the invention according to a preferred embodiment is described in further detail.

Typically, a 3-axis computer numerical control (CNC) machine is capable of functioning in the standard three axes of motion, which are usually defined in the traditional 3-axis manner by an X-axis, a Y-axis, and a Z-axis. These axes correspond to directions in which the cutting tool of a machine can move. Some advanced machines can move not only linearly in the standard X, Y, and Z axis directions, but can also move rotationally about one or more axes. In such applications, the A-axis typically refers to a rotational axis around the X-axis, the B-axis typically refers to a rotational axis around the Y-axis, and the C-axis typically refers to a rotational axis around the Z-axis. Generally, a positive rotation is defined as a counterclockwise (CCW) rotation looking from positive towards negative, for example in the A-axis, looking from X positive towards X negative.

On a "5-axis" machine, the cutting tool moves across the standard X, Y, and a Z linear axes and also moves rotationally around two rotational axes such as those explained above. However, 5-axis machines are very expensive and inappropriate for certain applications. Furthermore, typically when a cutting tool is changed from a machine, the code for the tool must be re-posted.

G-code is the common name for the most widely adopted numerical control programming language. While "g-code" is used throughout the application as the exemplary machine control code, various embodiments of the invention also may use any other appropriate code for controlling a CNC machine, such as conversational code. It is used in computer-aided manufacturing (CAM) to control CNC automated machine tools. Often, one of the largest providers of control systems for CNC machines is FANUC, which is a group of companies providing automated products including numerical controls and servo systems. The name FANUC is an acronym for Fuji Automatic NUmerical Control. Generally speaking, the g-code instructions are provided to a machine controller that instructs the motors of the machine where to move, how fast to move, and what path to follow. In one common application, the g-code defines the machining path for a cutting tool such that the tool is moved according to the instructions through a toolpath, thereby cutting away material from an object (such as a piece of metal or wood) to leave only the finished workpiece.

The reason for creating an alternative method of programming is to allow for tool compensation, both length and radius, to be accomplished at the machine tool when using aggregates. This can be accomplished when using standard 3-axis tools but the same offsets do not work with aggregates because the tool position and orientation has changed. In other words, the traditional calculations required for offset tables in an application involving no aggregate, when applied, would result in an adjustment of an unintended dimension in an application involving an aggregate. The typical method of programing aggregates does not allow this. Either the operator must manually adjust the protrusion of the tool, or have the programmer regenerate a new program based on the current tool length. Radius compensation cannot be performed at all on the machine tool and can only be comped in the CAM software and a new program generated. With this alternative method, both length and radius compensation can be applied in the normal tool offset registers. Note that, with particular embodiments of the invention such as those involving multi-axis toolpaths using an aggregate, the alternative method may not work without using an output in the traditional format.

The present invention provides a novel way of adding a rotational axis, such as the so-called "C-axis," to the machine code that controls CNC machines without the need of re-posting the code. Some embodiments of the invention involve programming based on the tip of the tool. Further, embodiments of the invention provide for using (1) canned cycles or "can-cycles" that are normally unavailable, (2) circular interpolation, (3) tool radius compensation, and (4) tool length compensation. Also, without re-posting the code, the present invention enables control of offset, length, and diameter; whereas, other machines cannot provide such controls without re-posting code.

Figure 2:
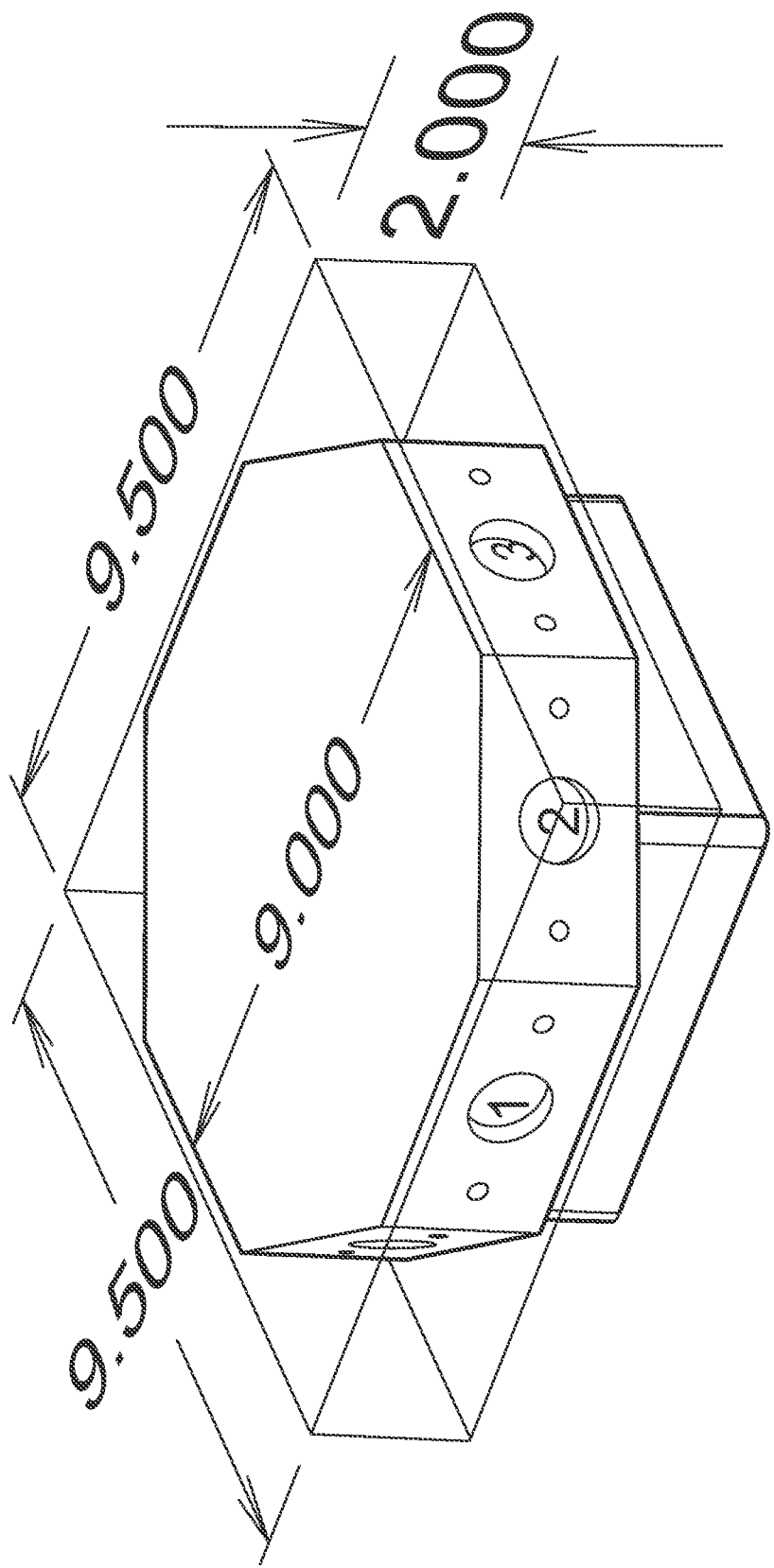
FIG. 2 illustrates the test workpiece being machined in FIG. 1.
Figure 3:
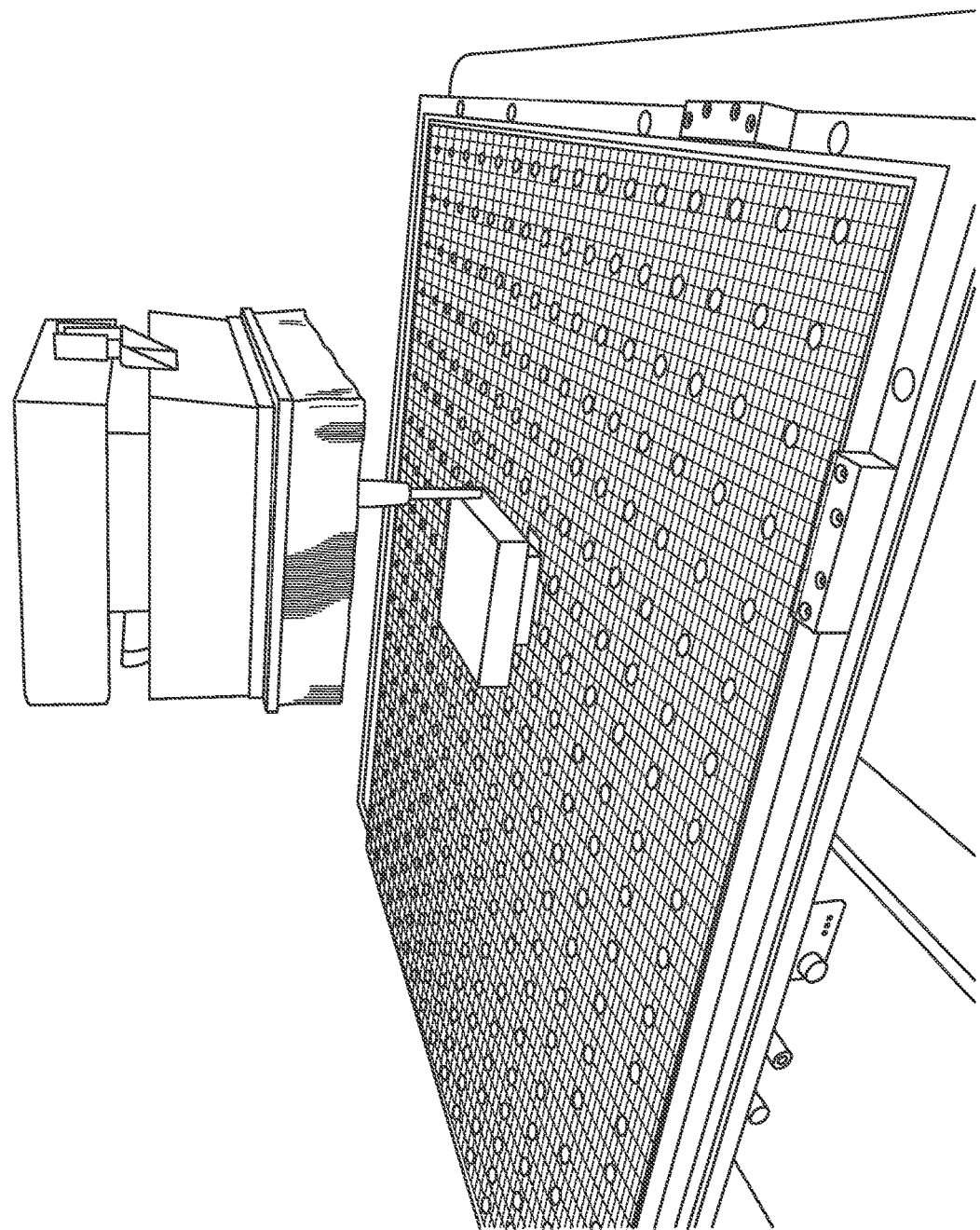
FIG. 3 illustrates the CNC machine in an early stage of machining the test workpiece of FIG. 2.
Figure 4:
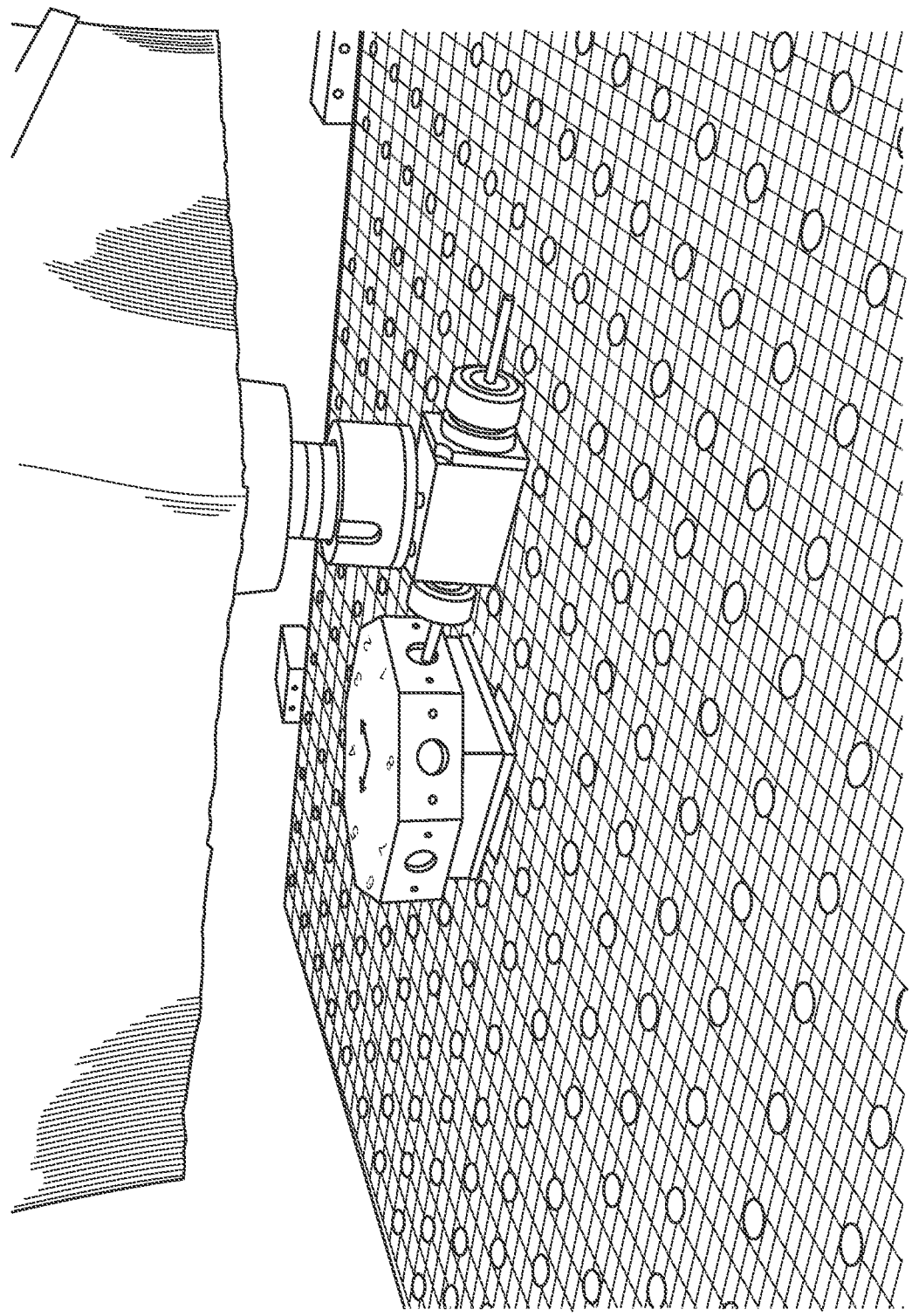
FIG. 4 illustrates the CNC machine in a later stage of machining the test workpiece of FIG. 2.
Figure 5:
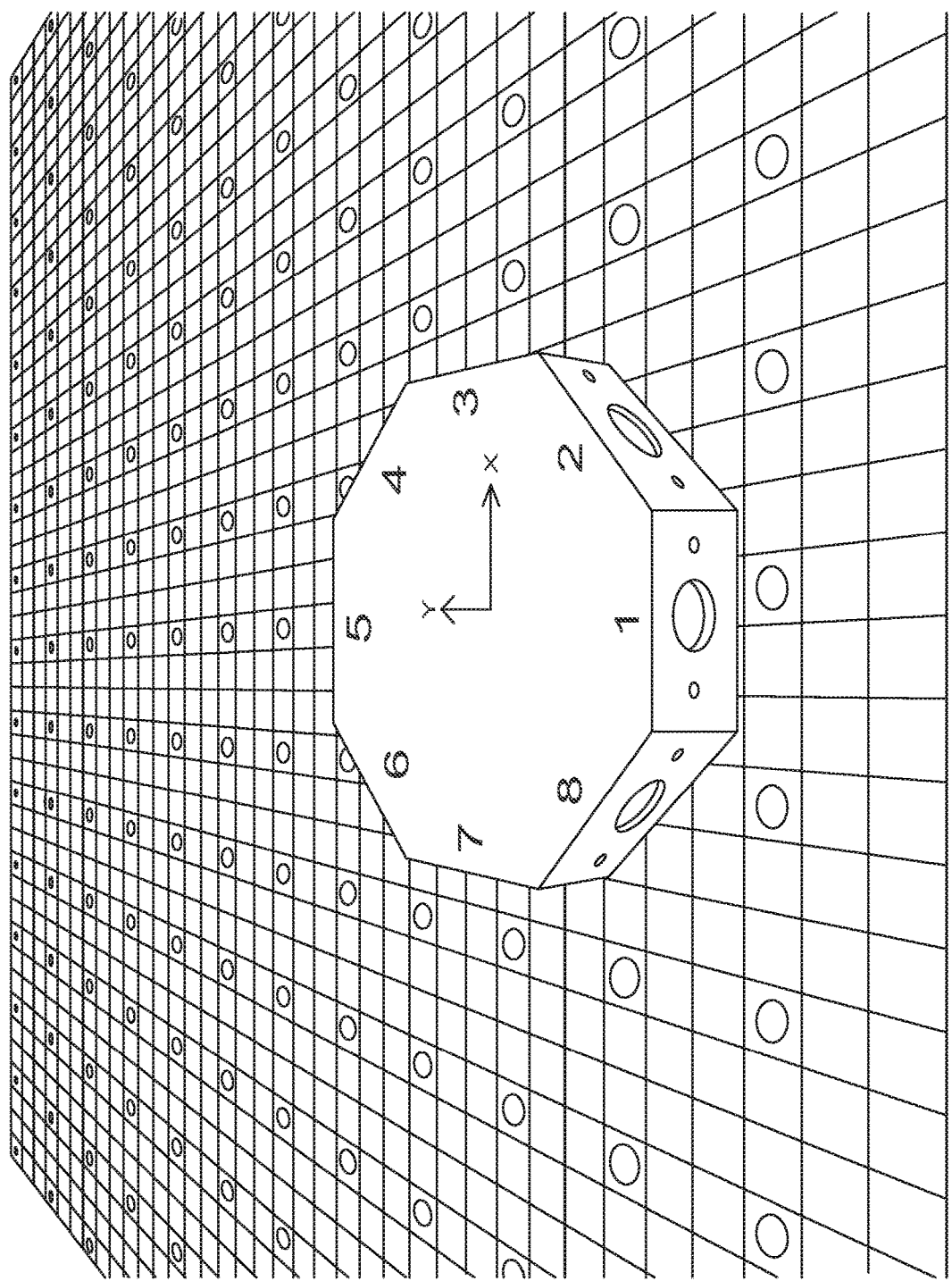
FIG. 5 illustrates a close-up view of the test workpiece shown in FIG. 2.

Referring to FIG. 1, a CNC machine having standard 3-axis movement functionality, as well as rotational functionality about the C-axis is shown machining a test workpiece. The test workpiece, as shown in the illustration of FIG. 2, has predefined dimensions. The part coordinate system, as shown in FIG. 2 defines the X, Y, and Z axes, with the C-axis being a rotational axis about the vertical Z-axis. FIG. 3 is a photograph of the CNC machine in the early stages of machining the workpiece. FIG. 4 is a photograph of the CNC machine in the latter stages of machining the workpiece. Notably, in FIG. 4, the machine tool is shown machining side 1 (see FIG. 5), but using rotation about the C-axis, the machine tool is enabled for machining each of the other seven sides of the workpiece without re-tooling.

Thus, this invention involves a more advanced way of programming aggregate tooling on a CNC machine. The method will apply to FANUC-controlled machinery and may also have applications with other types of control systems. The numeric control (NC) code was created in CAM software, such as Mastercam, then hand edited for correct structure. Any CAM software that can output multi-axis code with the above-noted compensation calls (i.e., length, diameter offsets, etc.) may be used. In certain applications, the method requires a custom post-processor to be developed for specific CAM software. In some embodiments, for example, the invention utilizes a custom post-processor developed for Mastercam.

In the photograph shown in the Figures, the torque arm, or anti-rotation pin, has been set up so that when the C-axis of the machine is at 0 degrees, the main side (½" Tool) is pointed at zero (0) degrees (X+) and the sub-side is at 180 degrees (X−). This value is referred to as Machine View Angle in Mastercam or Polar Adjustment in Alphacam and other CAM software may use alternative terms. In all the various examples, the aggregate body length is defined as zero (0) and compensation is made by setting the overall tool length as the center of the aggregate to the tip of the tool.

Figure 6:
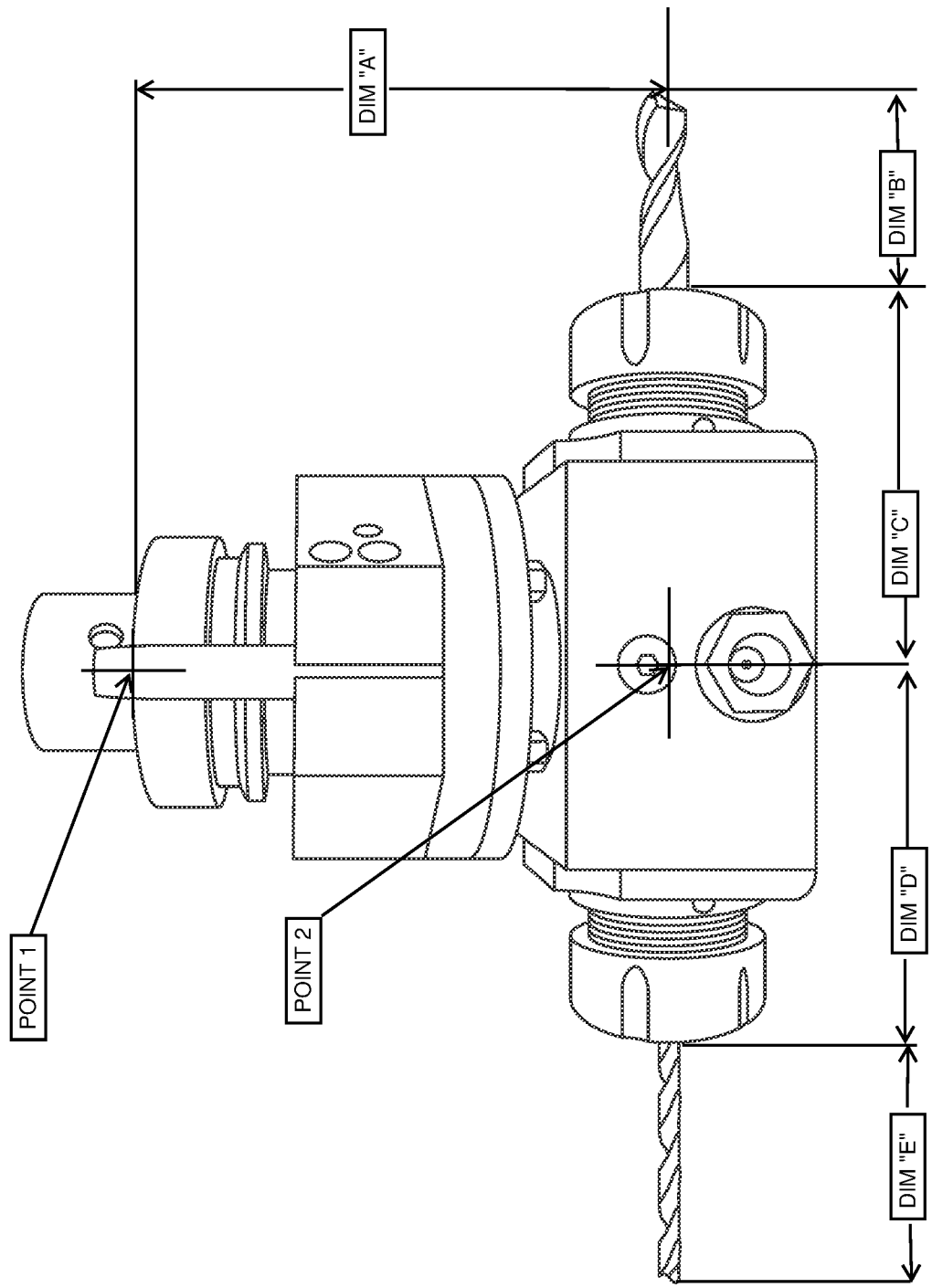
FIG. 6 illustrates an aggregate machine tool according to embodiments of the invention.

A typical aggregate programming method is illustrated by FIGS. 6-10. Referring now to FIG. 6, a photograph of an aggregate machine tool is shown. An "aggregate" or aggregate tool is an auxiliary tool that may expand the capabilities of a CNC machine when picked up by the spindle and generally includes multiple tools on the same unit and/or rotational capabilities enabling angled cutting or the like.

Dimension "A" is entered into the machine tool's tool offset register. Dimensions "B" and "E" are established and measured, then entered in the CAM software prior to NC code generation. Dimensions "C" and "D" are a part of the unit definition inside the CAM software. The CAM software will then add "B+C" or "D+E" to determine the offset from the centerline of the unit to the tool tip. The output or control point of the NC code is "Point 1" as shown above, but the tool length offset engagement will shift that control point to "Point 2".

Figure 7:
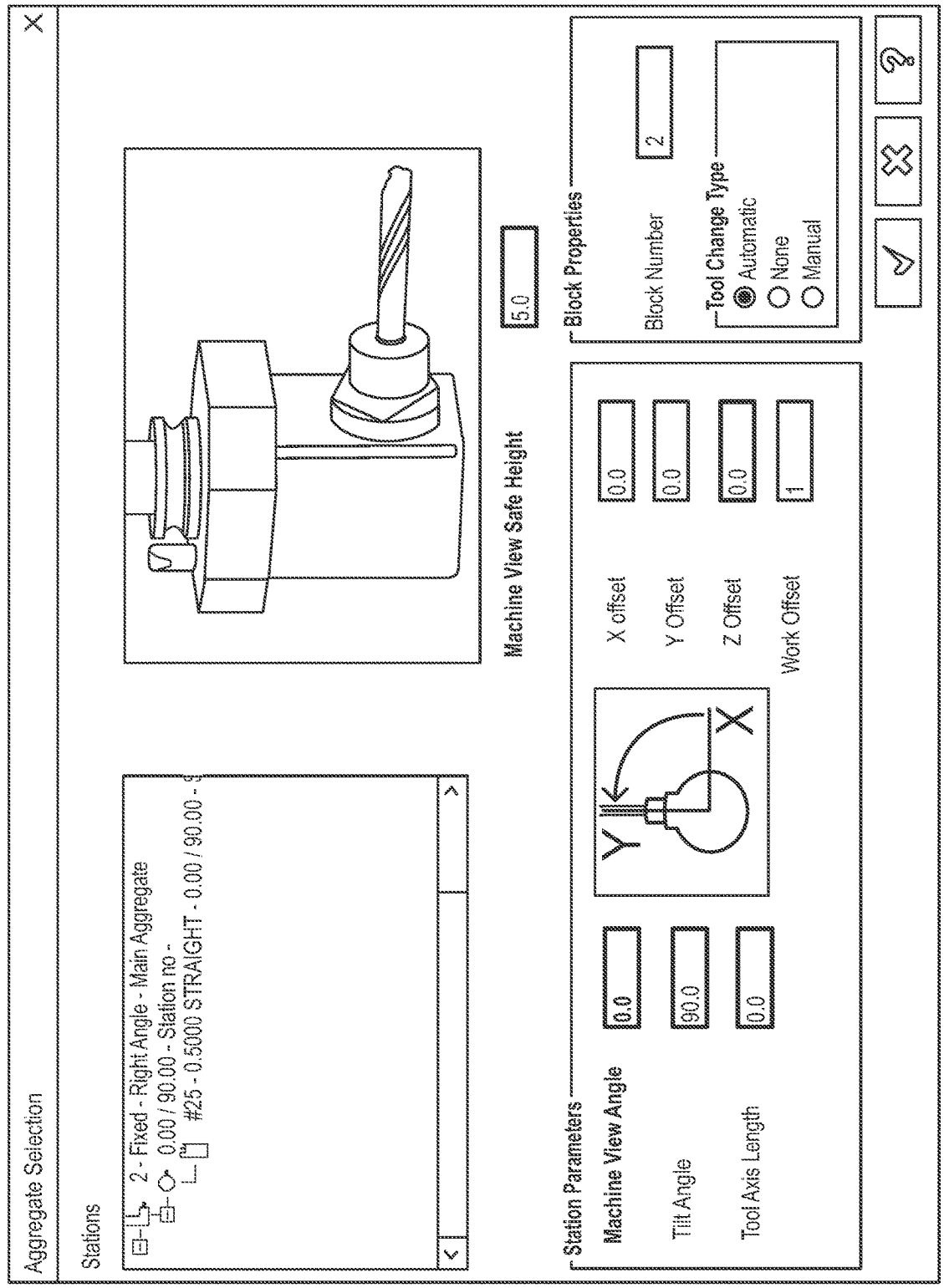
FIG. 7 illustrates a screenshot of an aggregate setup in a CAM software program according to embodiments of the invention.

Referring to FIG. 7, a screenshot of an aggregate setup in a typical CAM software program is shown. Machine View Angle=the angle of the tool when C=0. Tilt Angle=angle of the tool relative to the main spindle center line. Tool Axis Length=this would be the dimension "C" or "D". Machine View Safe Height=an absolute Z position for the aggregate to go to when traversing between different paths or planes.

Figure 8:
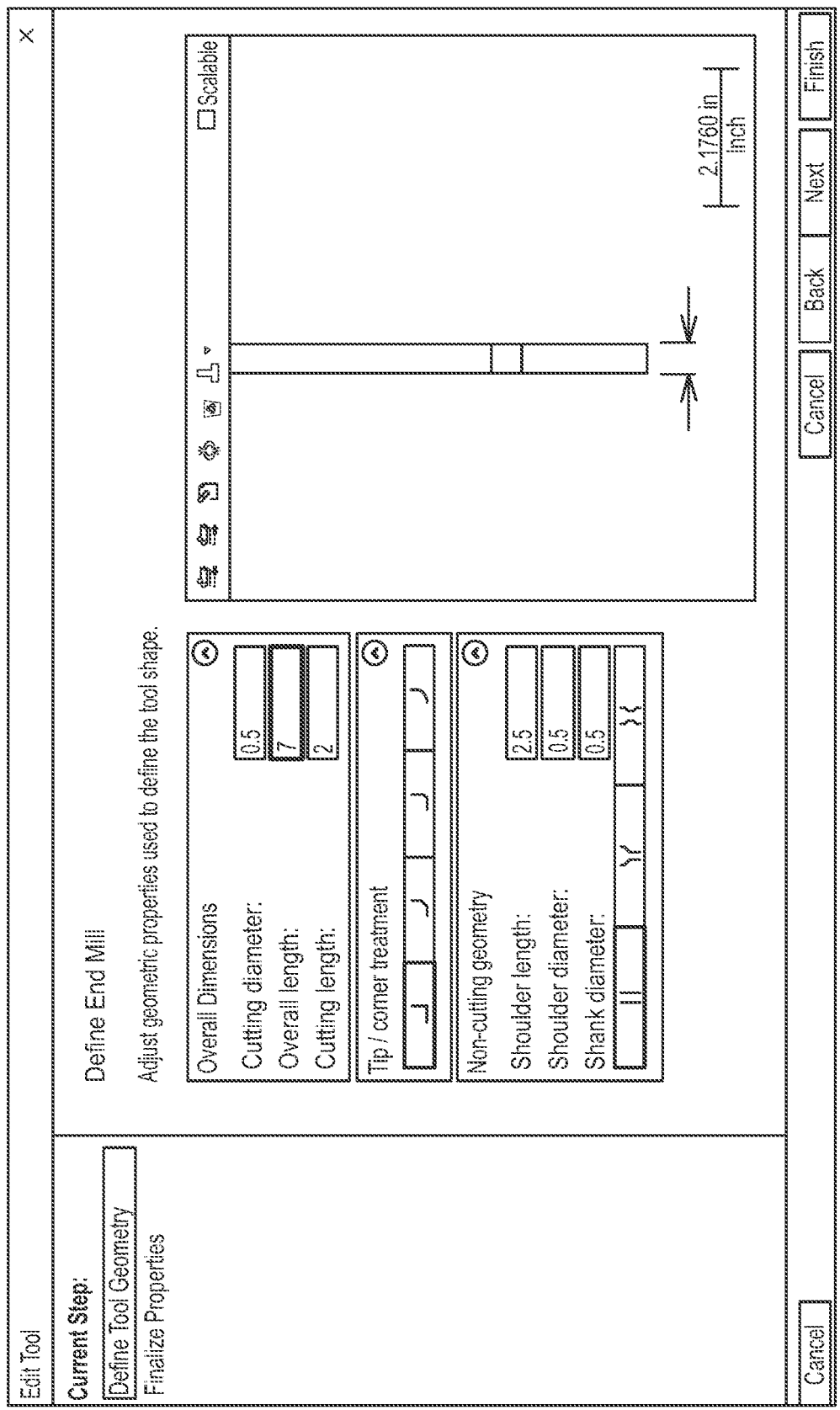
FIG. 8 illustrates another screenshot of an aggregate setup in a CAM software program according to embodiments of the invention.
Figure 9:
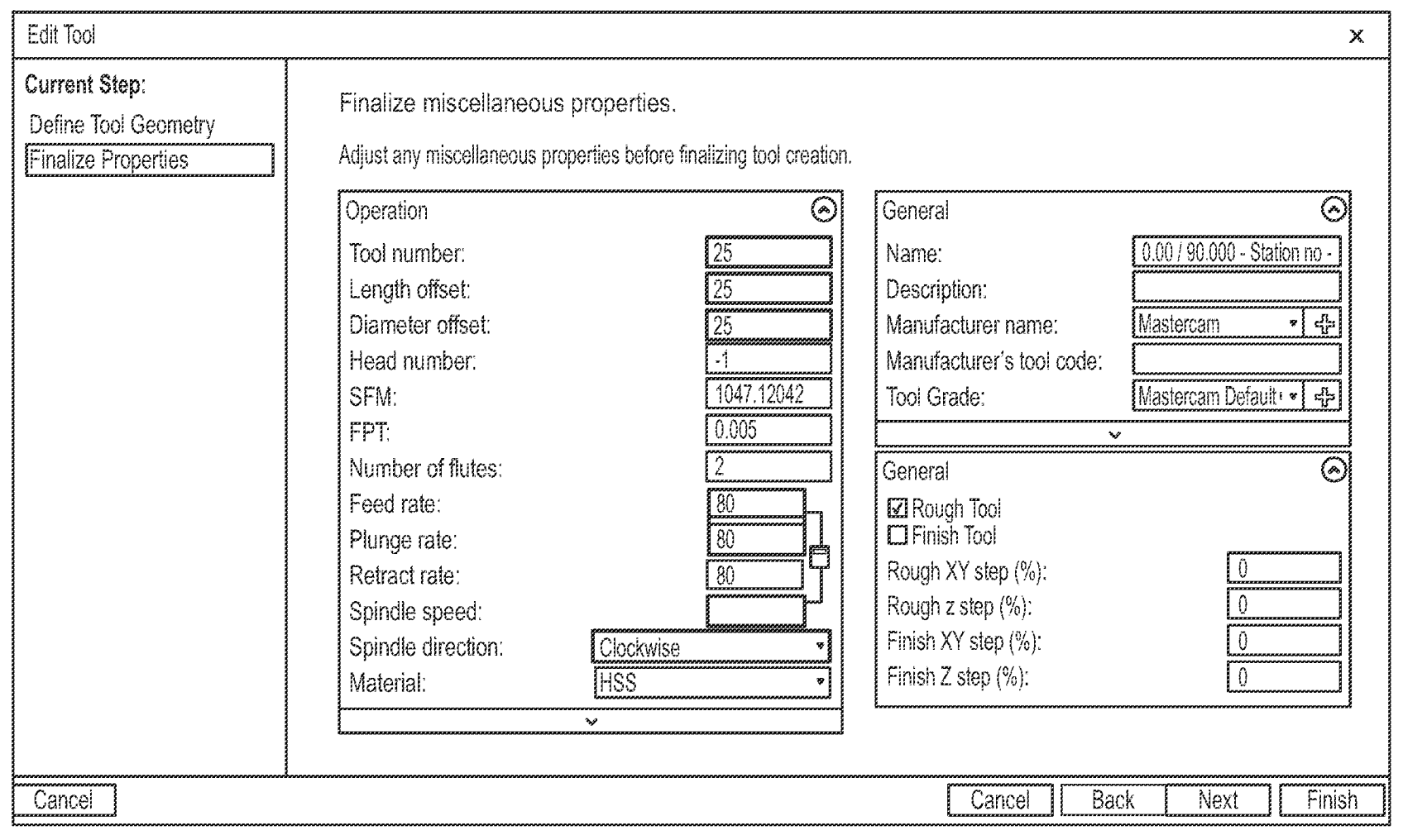
Figure 10:
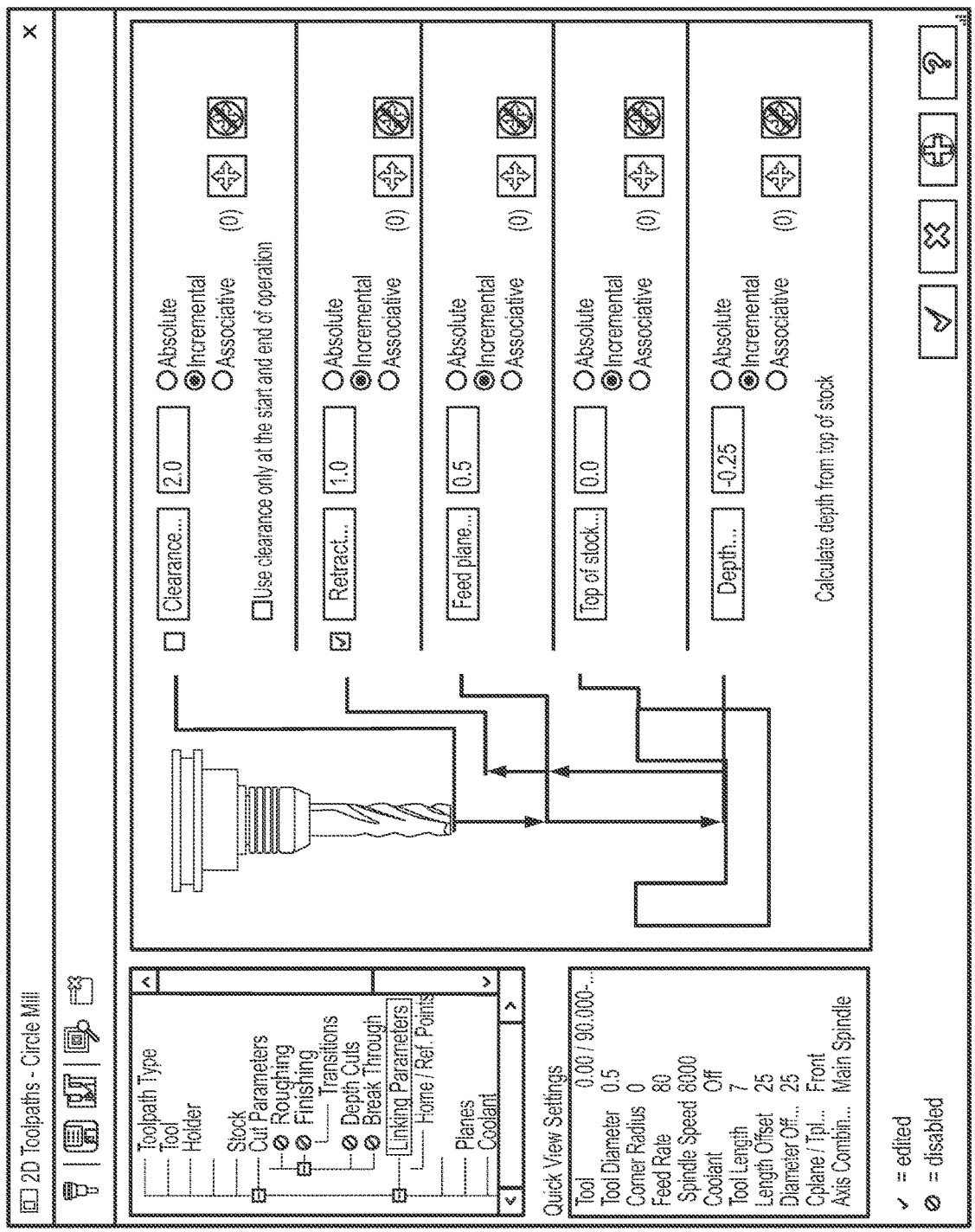
FIG. 10 illustrates another screenshot of an aggregate setup in a CAM software program according to embodiments of the invention.

Referring now to FIG. 8, another screenshot of an aggregate setup in the CAM software is shown. Overall Length=dimension "B" or "E". Referring to FIG. 9, another screenshot is shown. In this figure, the program allows for the aggregate tool parameters in the CAM for tool #, H #, D #, feeds, speeds, and rotation to be adjusted. Referring to FIG. 10, a screenshot of the CAM software illustrates linking parameters.

Below is a short segment of typical aggregate code—note that the coordinate system location is as shown in the photograph of FIG. 10.

```
N0023 (PLANE 1 - CIRCLE MILL)
N0024 (POSTED WITH 0. RAH STATION BODY LENGTH)
N0025 (POSTED WITH 7. TOOL GAUGE LENGTH)
N0026 (POSTED WITH 7. TOTAL COMP LENGTH)
N0027 M06 T25 (0.00/90.00 - STATION NO -)
N0028 G18 G20 G40 G49 G55
N0029 G64 G69 G80 G90 G94
N0030 G05.1 Q1 R5
N0031 G55
N0032 G00 C90. X4.75 Y-7.75 M03 S8000
N0033 G00
N0034 G43 H25 Z5. M96
N0035 Z1.
N0036 Y-7.25
N0037 G01 Y-6.5 F80.
N0038 G42 D25 X4.875 Z1.125
N0039 G02 X4.75 Z1.25 I-.125 K0.
N0040 X4.75 Z1.25 I0. K-.25
N0041 X4.625 Z1.125 I0. K-.125
N0042 G01 G40 X4.75 Z1.
N0043 G00 Y-7.75
N0044 Z5.
N0045 G05.1 Q0
N0046 G49
N0047 M05
N0048 M97
```

In machining the test workpiece, the circle on the face of plane 1 (front plane) is at X4.750 Y0.250 Z1.000.

Referring to line 32 (N0032), the X is the center of the circle: X4.75. The Y is the [0.250 (circle center point)]– [7.000 (Dim "A"+"B")]–[1.000 (Retract in linking parameters)]=Y–7.75. Referring to line 34 (N0034), the machine moves down in Z to Z5. ("Machine View Safe Height") while activating tool length comp H25 which is the "DIM A" that was entered into the tool register. Referring to line 35 (N0035), the aggregate comes down to Z1, which is the center of the hole. The tool tip is 1.00" (retract value) from the face of the workpiece. Referring to line 36 (N0036), the Y moves to Y–7.250 (feed plane value), resulting in the tool tip being 0.50" from the face of the workpiece. Referring to line 37 (N0037), the Y moves to Y–6.50 (depth value) plunging the tool into the part 0.25". Referring to line 38 (N0038), the cutter radius comp (G42) is being activated. This is possible only on cardinal faces by the use of G17, G18, G19 (see line 28). The cutter comp will not be possible with this type of code on faces 2, 4, 6, or 8. Referring to line 39 (N0039), the circular interpolation (G02) is being activated. Again, this is only possible on cardinal faces as well. Referring to line 43 (N0043), the tool returns to the retract plane. And finally, referring to line 44, the tool returns to "Machine View Safe Height."

In other implementations of typical aggregate code, because of the non-cardinal plane of machining, neither radius comp nor circular interpolation is possible. In such cases, the code for arcs may be linearized meaning it will be less smooth.

According to embodiments of the invention, an advanced aggregate programming method improves upon the historical aggregate programming methods. With reference again to FIG. 6, in the advanced aggregate programming method, Dimension "A" is entered into "Z Offset" in the aggregate set-up in the CAM software as shown in FIG. 7. Dimension "B+C" is entered into tool register #25. Dimension "D+E" is entered into tool register #26.

Through the use of tilted work plane (TWP or G68.2; described in detail below) and G43 on the resulting plane, the control point is shifted from "Point 1" to the center tip of the tool being programed. Through this method, the output or control point of the NC code will be the tool tip. Preferably, the programmer will enter dimensions "B, C, D, & E" into the CAM software as well as setting the overall length (OAL) of the tool as shown in FIG. 8. Another option for the programmer is to set OAL="B+C" or "D+E" and leave "C&D" set to zero (0) as is illustrated in these examples.

G-code G43 (as well as G44 and G49) is used for length compensation to adjust for differences in length between tools, without worrying about those differences in the tool program. TWP stands for tilted work plane, and is a purchased option for the CNC control system (for example, made by FANUC) that is activated by use of the g-code G68.2. It allows the program to create temporary virtual axes X, Y, & Z from a translation and rotation of the machine's axis. The use of G68.2 as used in these examples has no effect on the rotary C-axis position. The value for the C-axis will always be an absolute position. The format used for G68.2 is as follows: "G68.2 Xn Yn Zn In Jn Kn." The X, Y, and Z values are an incremental translation of the active coordinate system prior to the rotation and creation of the virtual axis. The I, J, and K values are the rotation of the axis and are executed in order as follows. Step (1) I=rotation about the Z axis. Step (2) J=rotation about the resulting X axis created in Step (1). Step (3) K=rotation about the resulting Z axis created in Step (2).

Some examples include the following:
EXAMPLE (1) G68.2 X0. Y0. Z0. I90. J0. K0.
Z+/– would still be the same, but the XY plane has been rotated 90 degrees.

So now an X+ move would actually move the Y in a + direction. Y+ moves X–, X– moves Y–, and Y– moves X+.
EXAMPLE (2) G68.2 X0. Y0. Z0. I0. J90. K0
This will set the coordinate system to the front plane where
X+/– are normal
Z+ actually moves Y–, Z– moves Y+
Y+ moves Z+, and Y– moves Z–
EXAMPLE (3) G68.2 X0. Y0. Z4. I90. J90. K0.
First this would increment the active coordinate system up in Z by 4.
Then rotate the axis about that point into the right plane.
X+ would now move Y+, X– would move Y–
Y+ would move Z+, Y– would move Z–
Z+ would move X+, and Z– would move X–
An example implementation of the g-code for the advanced aggregate programming method is shown below.

```
N0990 (PLANE 1 - CIRCLE MILL)
N0991 M06 T25 (0.00/90.00 - STATION NO -)
N0992 G17 G20 G40 G49 G56
N0993 G64 G69 G80 G90 G94
N0994 G05.1 Q1 R7
N0995 G56
N0996 G68.2 X0. Y0. Z4.9213 I0. J90. K0.
N0997 G43 H25
N0998 G00 X4.75 Z.75 C90. M03 S8000
N0999 X4.75 Y5. (M96)
N1000 Y1.
N1001 Z.25
```

```
N1002 G01 Z-.5 F80.
N1003 G41 D25 X4.875 Y1.125
N1004 G03 X4.75 Y1.25 I-.125 J0.
N1005 X4.75 Y1.25 I0. J-.25
N1006 X4.625 Y1.125 I0. J-.125
N1007 G01 G40 X4.75 Y1.
N1008 G00 Z.75
N1009 Y5.
N1010 G49
N1011 G69
N1012 (PLANE 2 - CIRCLE MILL)
N1013 G68.2 X0. Y0. Z4.9213 I45. J90. K0.
N1014 G43 H25
N1015 X6.7175 Y5. Z5.5 C135.
N1016 Y1.
N1017 Z5.
N1018 G01 Z4.25 F80.
N1019 G41 D25 X6.8425 Y1.125
N1020 G03 X6.7175 Y1.25 I-.125 J0.
N1021 X6.7175 Y1.25 I0. J-.25
N1022 X6.5925 Y1.125 I0. J-.125
N1023 G01 G40 X6.7175 Y1.
N1024 G00 Z5.5
N1025 Y5.
N1026 G49
N1027 G69
```

Figure 11:
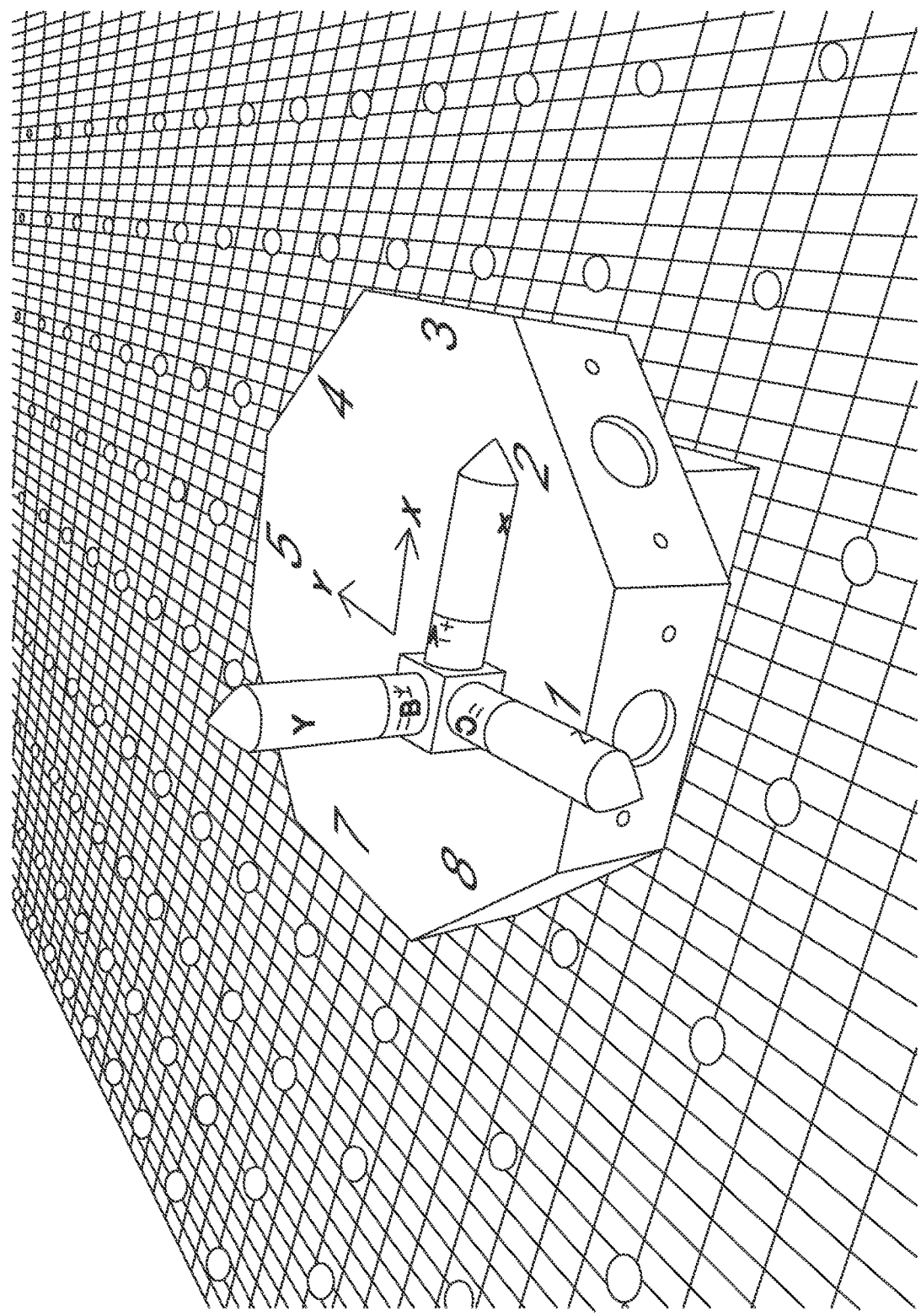
FIG. 11 illustrates a virtual coordinate system representation according to embodiments of the invention.

Referring to line 995 (N0995), the coordinate system G56 is activated. Referring to line 996 (N0996), the coordinate system is shifted up in Z by 4.9213 in (125 mm) for the aggregate intersecting rotations to spindle gage line "DIM A". This value comes from the "Z Offset" in the CAM software as shown in FIG. 7. The rotations are then applied to create a virtual coordinate system as shown in FIG. 11. In line 997 (N0997), the tool length H25 is applied to the virtual Z-axis. The value in H25 should be set to DIM "B+C". In line 998 (N0998), the approach to the part is made in virtual X, Z, and actual C. The spindle is started along with the move, and the tool length comp is made active. In line 999 (N0999), the aggregate comes down to Y5. In other words, this line causes a move of the machine in the actual Z-axis to 5 in. The value comes from "Machine View Safe Height" as shown in FIG. 7. In line 1000 (N1000), the tip of the tool travels to the center of the circle, whereby the value on the virtual Y-axis moves and the value on the actual Z-axis moves. In line 1001 (N1001), the tool goes to feed plane of 0.25 incremental, whereby the value on the virtual Z-axis moves and the value on the actual Y-axis moves. In line 1002 (N1002), the tool feeds into the workpiece 0.5 in deep, whereby the value on the virtual Z-axis moves and the value on the actual Y-axis moves.

In line 1003 (N1003), a lead-in move is activated in the virtual xy-plane, the cutter diameter comp D25 is activated. In lines 1004-1006 (N1004-N1006), the code provides for the circular interpolation of the hole. In line 1007 (N1007), a lead-out move is activated, and the diameter comp is cancelled. In line 1008 (N1008), a retraction of the tool is activated to the "Retract" position as shown in FIG. 10. In line 1009 (N1009), the aggregate is moved back up to the "Machine View Safe Height," whereby the value of the virtual Y-axis is moved and the value of the actual Z-axis is moved. In line 1010 (N1010), the active tool length is cancelled. Note that the tool length must be cancelled before changing or cancelling the TWP. In line 1011 (N1011), the TWP is cancelled. In lines 1012-1027 (N1012-N1027), the hole on plane two (2) is routed. In this maneuver, because of the use of TWP and cutter diameter comp, circular interpolation is possible.

Figure 12:
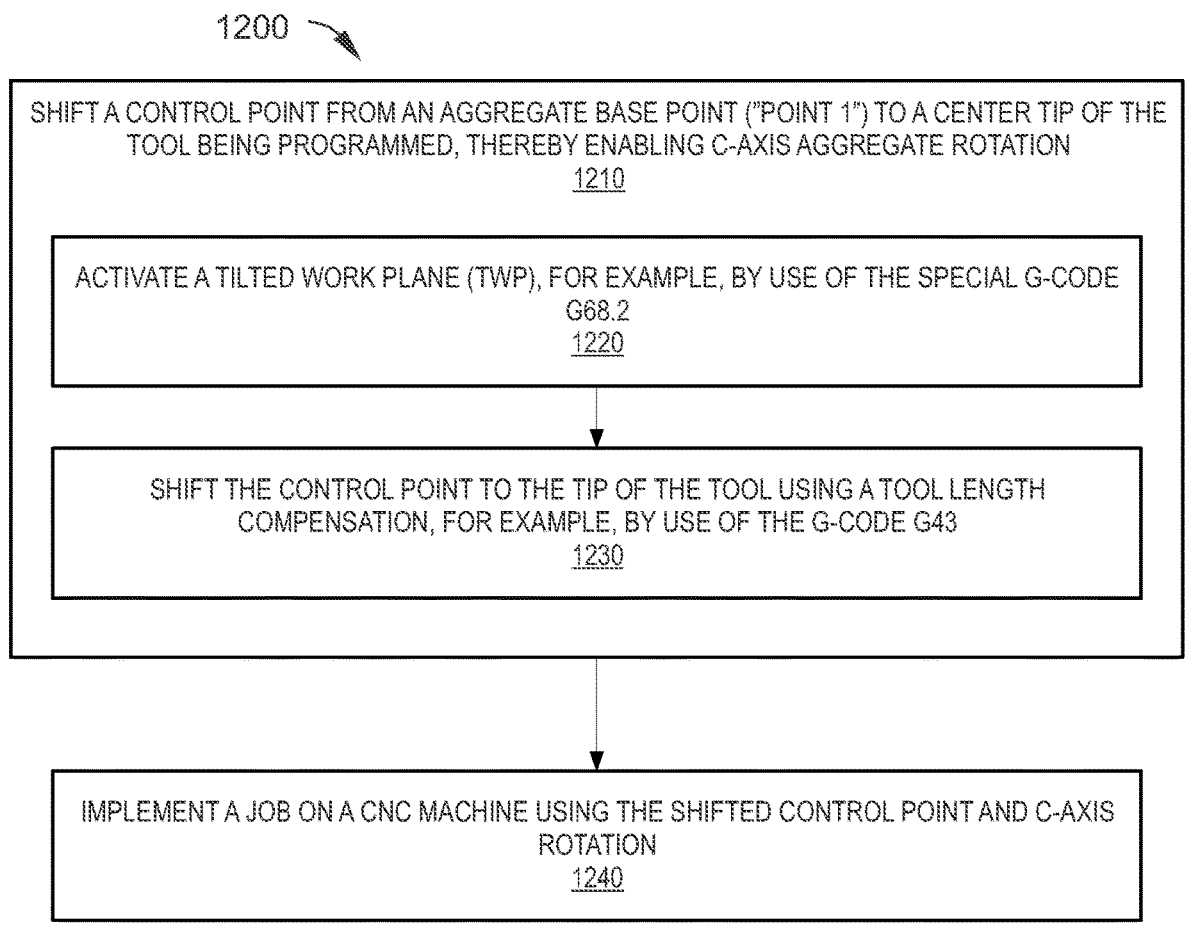
FIG. 12 is a flowchart illustrating a method 1200 for advanced aggregate programming for CNC machines according to embodiments of the invention.

In accordance with embodiments of the invention illustrated in FIG. 12, a method 1200 is provided for advanced aggregate programming for CNC machines. The first step, as represented by block 1210 is to shift a control point from an aggregate base point ("Point 1") to a center tip of the tool being programmed, thereby enabling C-axis aggregate rotation during a machine activity.

The next step, which may be a sub-step of step 1210 and is represented by block 1220, is to activate a tilted work plane (TWP). This may be done by use of a special machine control code (e.g., g-code G68.2) as discussed above.

The next step, which may be a sub-step of step 1210 and is represented by block 1230, is to use a tool length compensation machine control code to shift the control point to the tip of the tool. This may be done using a special machine control code, for example, g-code G43.

The final step, as represented by block 1240, is to implement an activity on a CNC machine using the shifted control point.

In various embodiments, none, one or more, or all of the steps of method 1200 are manually performed. In various other embodiments, none, one or more, or all of the steps of method 1200 are performed automatically. In some embodiments, some steps are manually performed and others are automatically performed; and in some embodiments, some steps are jointly performed manually and automatically.

Figure 13:
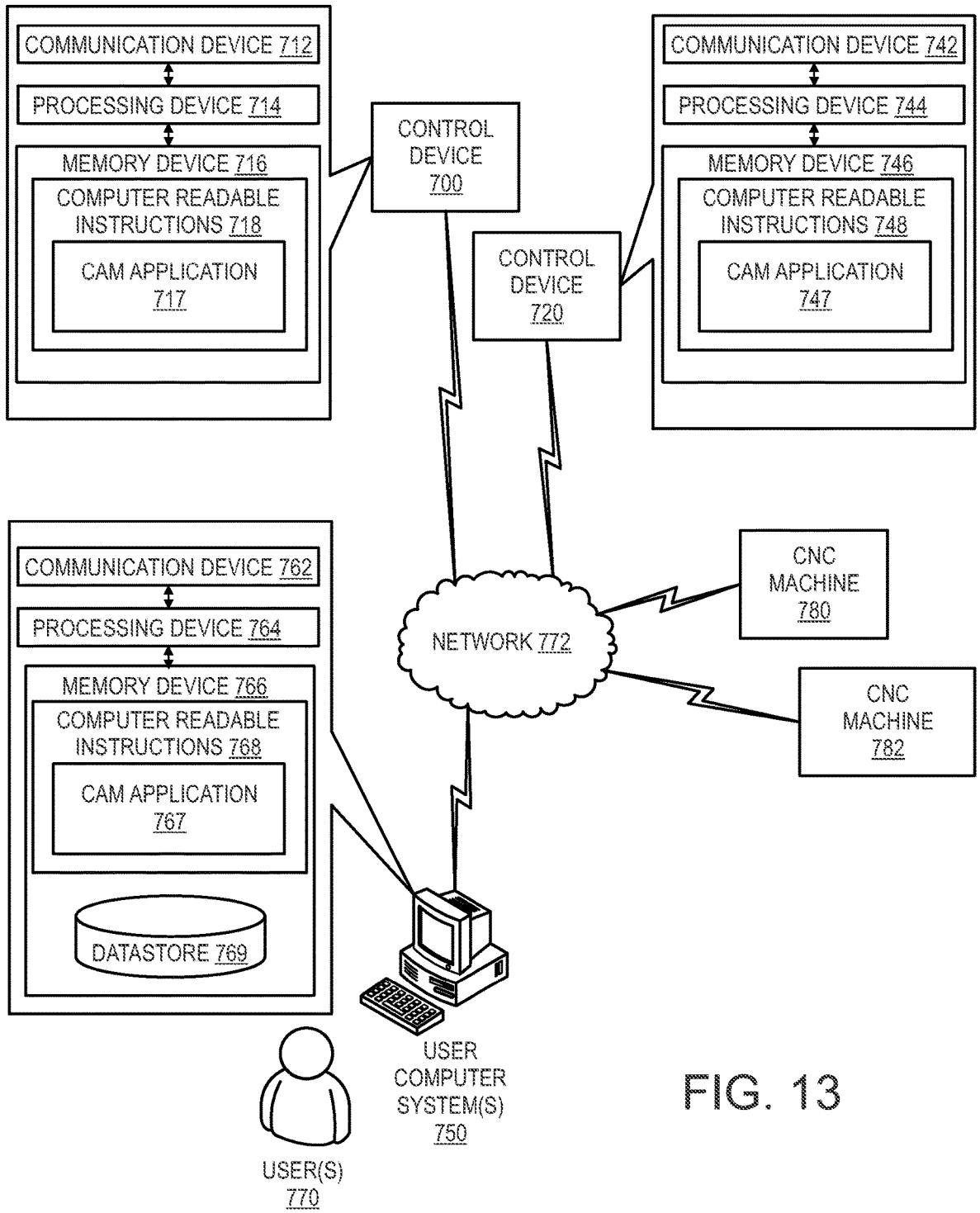
FIG. 13 illustrates an environment in which a system for advanced aggregate programming for CNC machines operates according to embodiments of the invention.

Referring now to FIG. 13, an environment in which a system for advanced aggregate programming for CNC machines 10 operates is shown.

A user computer system 750 is operatively coupled, via a network 772 to the control device 700 and control device 720, such as, for example, a control device made by FANUC. In this way, the user 770 may utilize the user computer systems 750 to administer operation of one or more CNC machines. FIG. 13 illustrates only one example of embodiments of a such an environment, and it will be appreciated that in other embodiments one or more of the systems (e.g., computers, control devices, CNC machines, aggregates, other machine tools, or other like components or systems) may be combined into a single system or be made up of multiple systems.

The network 772 may be a global area network (GAN), such as the Internet, a wide area network (WAN), a local area network (LAN), or any other type of network or combination of networks. The network 772 may provide for wireline, wireless, or a combination of wireline and wireless communication between devices on the network. The network may also be or represent hardline connections between and/or among certain components within the system. For example, in one embodiment, control device 700 is hardwired to a specific CNC machine such as CNC machine 780. Similarly, control device 720 may be hardwired to a specific CNC machine, such as CNC machine 782. In some embodiments, one of control device 700 or 720 also receives and/or transmits signals from/to other CNC machines (not shown). In other embodiments, multiple control devices control differing aspects of a single CNC machine.

As illustrated in FIG. 13, the user computer systems 750 may include a communication device 762, a processing device 764, and a memory device 766. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 764 is operatively coupled to the communication device 762 and the memory device 766. The processing device 764 uses the communication device 762 to communicate with the network 772 and other devices on the network 772, such as, but not limited to, control devices 700 and 720. As such, the communication device 762 generally comprises a modem, server, or other device for communicating with other devices on the network 772.

As further illustrated in FIG. 13, the user computer system 750 comprises computer-readable instructions 768 stored in the memory device 766, which in one embodiment includes the computer-readable instructions 768 of a CAM application 767, such as a CAM application corresponding to a particular type of controller such as a FANUC controller. In some embodiments, the memory device 766 includes a datastore 769 for storing data related to the user computer system 750 and operation of the CNC machines, including but not limited to data created and/or used by CNC machines and/or control devices.

As further illustrated in FIG. 13, the control device 700 generally includes a communication device 712, a processing device 714, and a memory device 716. The processing device 714 is operatively coupled to the communication device 712 and the memory device 716. The processing device 714 uses the communication device 712 to communicate with the network 772, and other devices on the network 772.

Similarly, control device 720 may include a communication device 742, a processing device 744, and a memory device 746. The processing device 744 is operatively coupled to the communication device 742 and the memory device 746. The processing device 744 uses the communication device 742 to communicate with the network 772, and other devices on the network 772.

In some cases, one or both of control devices 700 and/or 720 (and/or other control devices) may be specific-purpose control devices that are hard-coded to perform a finite set of instructions. In such cases, the CAM applications 717 and/or 747 may be hard-coded into the control device(s) as machine code. That is, the control devices may not be programmable in real-time, such as by communication with a user computer system 750. In other embodiments, however, the control device(s) are configured for real-time or near real-time programming such that they may be controlled by the user computer system 750.

In various embodiments, the CAM application 767 may enable the user 770 to program in g-code. In some cases, once a g-code program is complete it may be transferred to one or more control devices, such as control device 700 or control device 720. The program may then be executed by the control device 700 or 720, thereby causing the CNC machine 780 or 782 to perform the steps dictated by the g-code program. In some implementations, once a particular g-code program is complete, it may be stored in the control device for re-use by an operator of the CNC machine. In other cases, such as in automated applications, the g-code may be hard-coded into the control device as discussed above so that the g-code program may be performed as indicated by some other control program or in response to one or more triggers, such as a new workpiece being moved into place for cutting.

As described herein, an advanced aggregate programming system and method have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described in this application.

What is claimed is:

1. A method for programming a computer numerical control (CNC) machine including an aggregate tool unit having an aggregate body for receiving at least one tool, comprising the steps of:
   (a) shifting a control point from a base point of the aggregate body of the aggregate tool unit to a tool tip of the at least one tool of the aggregate tool unit, wherein the tool tip is configured to contact a workpiece during a machine activity, thereby enabling C-axis rotation of the aggregate tool unit during the machine activity, comprising:
      (i) activating a tilted work plane (TWP), wherein the TWP does not form part of the aggregate tool; and
      (ii) shifting the control point from the base point of the aggregate body of the aggregate tool unit to the tool tip of the at least one tool of the aggregate tool unit using a tool length compensation; and
   (b) implementing an activity on the CNC machine using the shifted control point and the C-axis rotation of the aggregate tool unit.

2. The method of claim 1, wherein the activating the TWP comprises using a special machine control code.

3. The method of claim 2, wherein the special machine control code is g-code G68.2.

4. The method of claim 1, wherein the shifting the control point to the tool tip of the at least one tool of the aggregate tool unit using the tool length compensation comprises using a special machine control code.

5. The method of claim 4, wherein the special machine control code is g-code G43.

6. The method of claim 1, wherein the shifting the control point to the tool tip of the at least one tool of the aggregate tool unit consists of using the tool length compensation.

7. The method of claim 1, wherein the C-axis rotation of the aggregate tool unit during the machine activity is enabled without reposting code for the aggregate tool unit.

8. A system for programming a computer numerical control (CNC) machine including an aggregate tool unit having an aggregate body for receiving at least one tool, comprising:
   (a) one or more memory devices; and
   (b) one or more processing devices operatively coupled to the one or more memory devices, wherein the one or more processing devices are configured to execute computer-readable computer program code to:
      (i) shift a control point from a base point of the aggregate body of the aggregate tool unit to a tool tip of the at least one tool of the aggregate tool unit, wherein the tool tip is configured to contact a workpiece during a machine activity, thereby enabling C-axis rotation of the aggregate tool unit during the machine activity, the shifting comprising the steps of:
         (A) activating a tilted work plane (TWP), wherein the TWP does not form part of the aggregate tool unit;
         (B) shifting the control point from the base point of the aggregate body of the aggregate tool unit to the tool tip of the at least one tool of the aggregate tool unit using a tool length compensation; and
      (ii) implementing an activity on the CNC machine using the shifted control point and the C-axis rotation of the aggregate tool unit.

9. The system of claim 8, wherein the activating the TWP comprises using a special machine control code.

10. The system of claim 9, wherein the special machine control code is g-code G68.2.

11. The system of claim 8, wherein the shifting the control point to the tool tip of the at least one tool of the aggregate tool unit using the tool length compensation comprises using a special machine control code.

12. The system of claim 11, wherein the special machine control code is g-code G43.

13. The system of claim 8, wherein the shifting the control point to the tool tip of the at least one tool of the aggregate tool unit consists of using the tool length compensation.

14. The system of claim 8, wherein the C-axis rotation of the aggregate tool unit during the machine activity is enabled without reposting code for the aggregate tool unit.

15. A computer numerical control (CNC) machine including an aggregate tool unit having an aggregate body for receiving at least one tool, the CNC machine programmed to:
   (a) shift a control point from a base point of the aggregate body of the aggregate tool unit to a tool tip of the at least one tool of the aggregate tool unit, wherein the tool tip is configured to contact a workpiece during a machine activity, thereby enabling C-axis rotation of the aggregate tool unit during the machine activity, comprising:
      (i) activating a tilted work plane (TWP), wherein the TWP does not form part of the aggregate tool unit; and
      (ii) shifting the control point from the base point of the aggregate body of the aggregate tool unit to the tool tip of the at least one tool of the aggregate tool unit using a compensation consisting of a tool length compensation, wherein the shifting of the control point is unrelated to axis positions of the TWP; and
   (b) implement an activity on the CNC machine using the shifted control point and the C-axis rotation of the aggregate tool unit.

16. The computer numerical control (CNC) machine of claim 15, wherein the activating the TWP comprises using a special machine control code.

17. The computer numerical control (CNC) machine of claim 16, wherein the special machine control code is g-code G68.2.

18. The computer numerical control (CNC) machine of claim 15, wherein the shifting the control point to the tool tip of the at least one tool of the aggregate tool unit using the tool length compensation comprises using a special machine control code.

19. The computer numerical control (CNC) machine of claim 18, wherein the special machine control code is g-code G43.

20. The computer numerical control (CNC) machine of claim 15, wherein the C-axis rotation of the aggregate tool unit during the machine activity is enabled without reposting code for the aggregate tool unit.

\* \* \* \* \*